Figure 1:
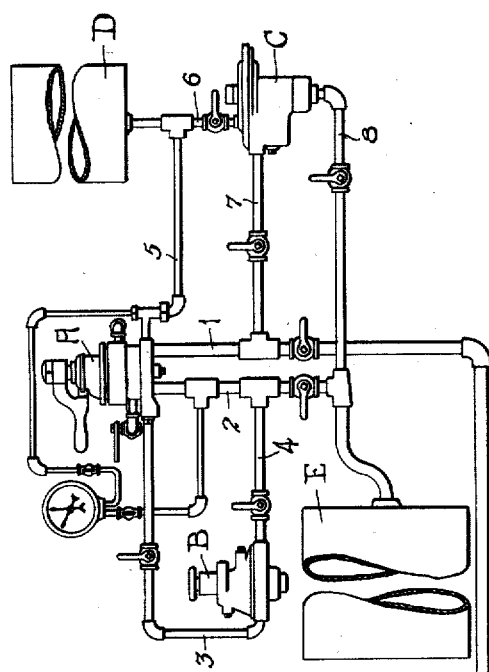
Figure 1:
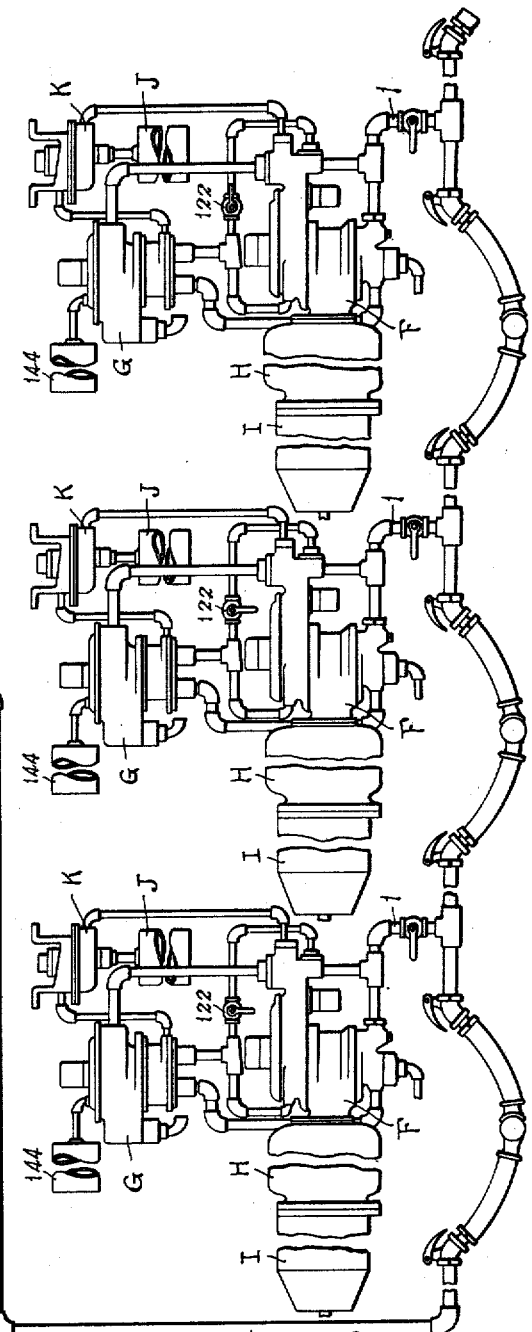

S. G. NEAL.
AIR BRAKE SYSTEM.
APPLICATION FILED MAY 11, 1918. RENEWED MAY 1, 1919.

1,314,975.

Patented Sept. 2, 1919.
3 SHEETS—SHEET 1.

Inventor
Spencer G. Neal
By his Attorneys

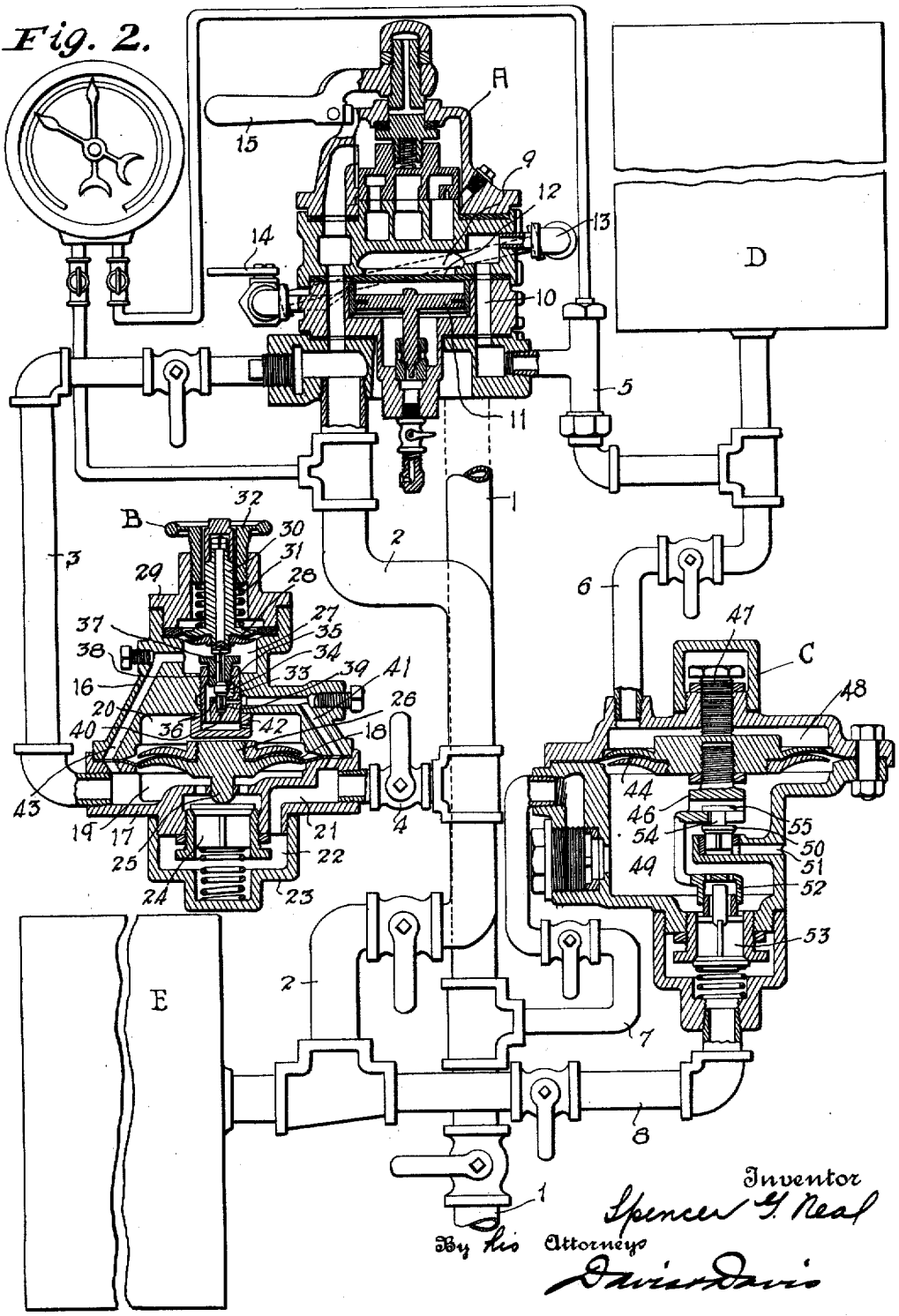

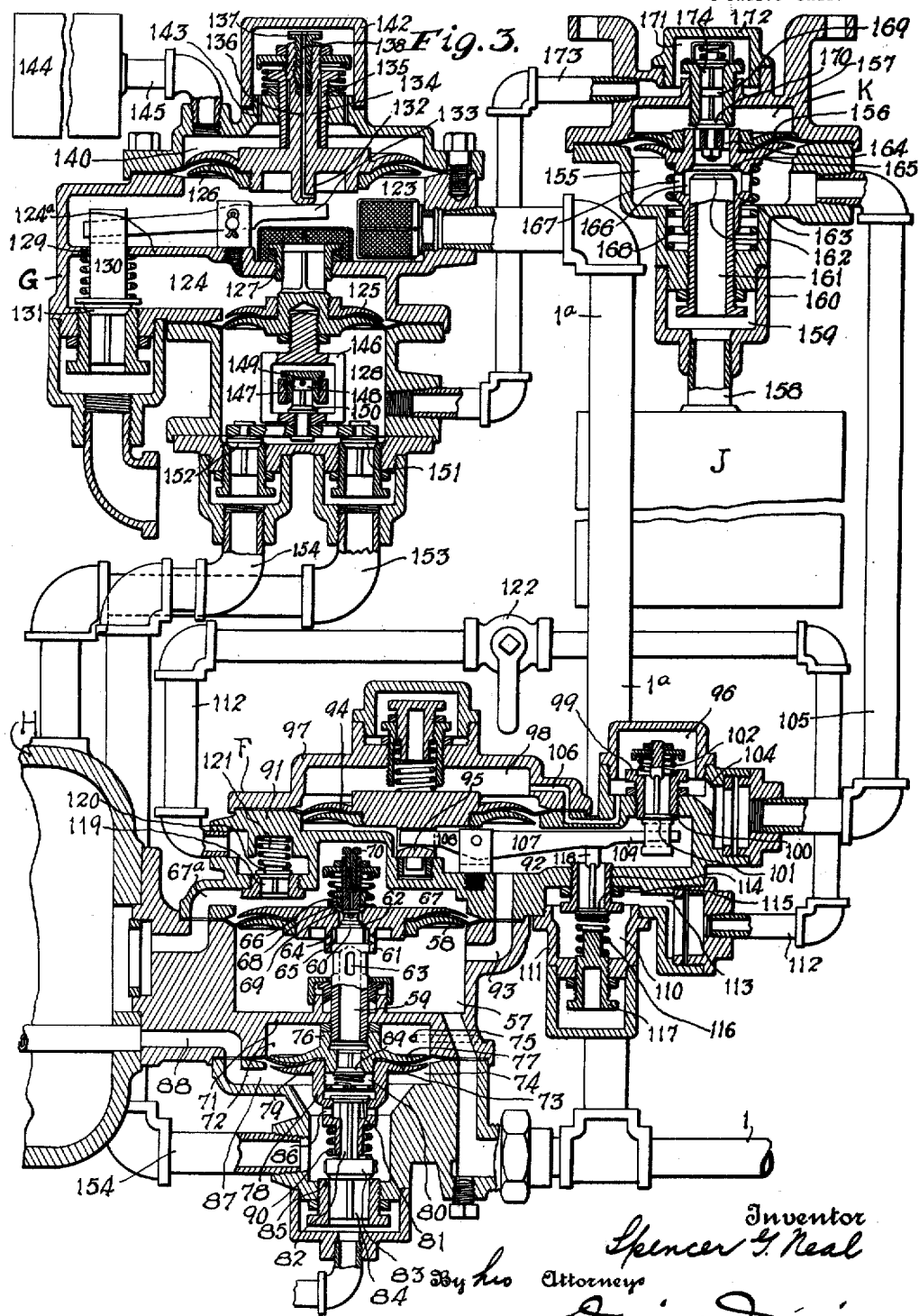

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE SYSTEM.

1,314,975.      Specification of Letters Patent.      Patented Sept. 2, 1919.

Application filed May 11, 1918, Serial No. 233,999. Renewed May 1, 1919. Serial No. 293,947.

*To all whom it may concern:*

Be it known that I, SPENCER G. NEAL, a citizen of the United States, and resident of the borough of Manhattan, city, county, and State of New York, have invented certain new and useful Improvements in Air-Brake Systems, (Case #32,) of which the following is a specification.

This invention relates to improvements in that class of air brake systems in which the triple valves are operated upon a slow reduction in train pipe pressure to connect the train pipe with the brake cylinder for a service application of the brakes by train pipe pressure alone; a sudden reduction in train pipe pressure operating means to connect an emergency reservoir with the brake cylinder for an emergency application of the brakes. In air brake systems of this type a train pipe augmenting reservoir is connected to the train pipe during all slow reductions in train pipe pressure for service applications of the brakes, and means are operated by a sudden reduction in train pipe pressure to seal the train pipe reservoir from the train pipe during emergency applications of the brakes so that the train pipe reservoir will not be depleted with the train pipe during emergency applications of the brakes.

One of the main objects of this invention is to provide an engine equipment for use in air brake systems of the type herein indicated, which shall consist of an engineer's brake valve, a feed valve and a train pipe compensator adapted to maintain the train pipe pressure at any desired pressure established in the equalizing reservoir.

Another object of the invention is to provide a series of brake units, one for each car of the train, each unit embodying means for obtaining a graduated release of the brakes or a quick release of the brakes as may be desired, both the quick release and the graduated release operating upon an increase of train pipe pressure without regard to the rate of increase.

Another object of the invention is to provide an air brake system in which the graduated release of the brakes and the quick release of the brakes may be secured upon a certain definite increase in train pipe pressure below the full-release pressure and without moving the triple valve to full-release position, and upon a certain definite rise in train pipe pressure without regard to the rate of increase.

Another object of the invention is to provide an air brake system in which, upon a certain definite rise in train pipe pressure, a quick release of the brakes will be obtained in certain of the braking units, and a graduated or partial release will be secured in the other braking units upon a certain definite rise in train pipe pressure below full-release pressure and without moving the triple valves to full-release position, the braking units arranged or adjusted for quick release operating to connect the emergency reservoir with the train pipe to locally raise the train pipe pressure above that established through the engineer's brake valve, whereby the initial graduated-release pressure established through the brake valve will be increased by air flowing into the train pipe from the emergency reservoirs of the triple valves set for quick-release operation, thereby securing a further release of the brakes in those units whose triple valves are set for graduated-release operation.

Another object of the invention is to provide in an air brake system of the type herein described, a compensator on the engine controlled by equalizing reservoir pressure opposed to train pipe pressure, and controlling a connection between the main reservoir and the train pipe and between the train pipe and atmosphere whereby train pipe air to compensate for brake cylinder leaks will be supplied from the main reservoir through the operation of the compensator independently of the engineer's brake valve after the desired train pipe pressure has been established in the equalizing reservoir. As the triple valves establish a uniform braking pressure in the brake cylinders without regard to length of piston travel and brake cylinder leakage, it is manifest that through the means for maintaining constant the established train pipe pressure, uniform braking pressure will be maintained in all the brake cylinders throughout the train.

Another object of the invention is to provide an air brake system in which a certain initial graduated-release pressure may be established in the train pipe through the engineer's brake valve, and a subsequent increased graduated-release pressure may be established in the train pipe by the local discharge into the train pipe of air from the emergency reservoirs of triple valves set for quick-release operation, the subsequent increased release pressure being brought about by a certain definite rise in train pipe pressure without regard to the rate of rise and without moving the triple valves of the graduated-release triples to full-release position.

Another object of the invention is to provide an air brake system in which a certain definite graduated-release pressure may be established at the head end of the train through the engineer's brake valve, said pressure being sufficient to operate triples at the rear end of the train set for quick-release operation, the operation of said quick-release triples sending a wave of increased pressure through the train pipe from the rear end toward the head end of the train thereby securing a further graduated release of the triples at the head end of the train set for graduated-release operation.

There are other important objects and advantages of the invention which will appear more fully hereinafter, and the foregoing are set forth merely as indicating some of the important features of this invention.

In the drawings, Figure 1 is a diagrammatic view of an engine equipment and three car equipments or braking units;

Fig. 2 a vertical sectional view of the apparatus constituting the engine equipment, the main reservoir, equalizing reservoir and piping being shown diagrammatically; and Fig. 3 a vertical sectional view of the apparatus constituting the car equipment, the brake cylinder being omitted and the emergency reservoir being broken away.

The engine equipment consists of an engineer's brake valve A, a feed valve B, a compensator C, an equalizing reservoir D and a main reservoir E. Each braking unit or car equipment comprises a triple valve service section F; an emergency section G; an emergency reservoir H; brake cylinder I; train pipe reservoir J; and a change-over valve K.

The engineer's brake valve is of the usual type and is connected to the train pipe 1 in the usual manner; and to the main reservoir by pipe 2. The feed valve is connected to the brake valve through pipe 3, and to the main reservoir pipe through pipe 4. The equalizing reservoir is connected to the brake valve through pipe 5 and to the compensator through pipe 6; and the compensator is connected to the train pipe through pipe 7, and to the main reservoir through pipe 8. The equalizing chamber 9 is connected to the equalizing reservoir D through passage 10. The usual equalizing piston 11 is sealed from the equalizing chamber 9 by means of an imperforate or blind gasket 12, so that said piston will not be affected by pressure from the equalizing reservoir, and the exhaust port controlled by the equalizing piston will remain closed at all times. In order to render the equalizing piston operative if it may be so desired, the chamber 9 is connected to the space between the equalizing piston and the gasket 12 by means of a by-pass 13 in which is arranged a valve 14. When operating with the compensator C the valve 14 is closed in order to render the equalizing piston 11 inoperative. When it is desired that the equalizing piston shall operate in the usual manner the valve 14 is opened. The operation of the brake valve through the brake valve handle 15 is precisely the same whether or not the equalizing piston 11 be operative or inoperative, so that the manipulation of the engineer's brake valve is the same in the operation of the brakes described in this brake system as when operating in the ordinary type of automatic air brakes.

The feed valve B is very sensitive and is of large capacity, whereby the normal operating or running train pipe pressure may be quickly obtained.

The body of the feed valve shown consists of two sections, an upper section 16 and a lower section 17, said lower section carrying the valve which controls communication between the main reservoir and the train pipe chamber within the valve casing. Clamped between the two sections is the valve operating diaphragm 18 which forms the upper wall of a train pipe chamber 19 and the lower wall of a valve closing chamber 20. The chamber 20 is formed in the lower part of the section 16, and the train pipe chamber 19 is formed in the upper part of section 17. The free part of the diaphragm 18 vibrates to a limited extent in response to variations in pressures in the train pipe chamber and in the valve closing chamber.

The main reservoir supply pipe 4 is connected to the section 17 of the casing below the diaphragm 18 and is in communication through a passage 21 with a main reservoir supply chamber 22 formed by cap 23 secured to the bottom of the casing. The section 17 is provided at its lower end with a bushing whose upper end forms a seat for a downwardly seating inlet valve 24. The diaphragm 18 is clamped between two plates or disks, the lower one being provided with a depending stem 25 which passes through a spider wall and engages the upper surface of the valve 24. Said plate is also formed with an upwardly extending central stud 26 on which is threaded the upper clamping plate. The upper end of the stud 26 is adapted to contact with a fixed stop to limit the upward movement of the diaphragm, as will be more fully hereinafter described.

In the upper end of section 16 of the valve casing is formed a controlling chamber 27, the upper wall of said chamber being formed by a controlling diaphragm 28, said diaphragm being held in place by a clamping ring. This ring is held in place by an upwardly extending cup 29 secured to the top of the casing section 16. A plunger 30 rests on the upper side of the controlling diaphragm and said plunger is formed with a depending, central, threaded stud on which is screwed a lower clamping plate which forms a support for the under side of the controlling diaphragm. In the cup 29 and surrounding the upwardly extending stem of the plunger 30 is a controlling spring 31, the pressure of said spring on the plunger being regulated by an adjustable sleeve 32 which is threaded in the upper end of the cup 29. It is manifest that by adjusting this sleeve in the cup the pressure of the spring on the plunger may be varied as desired.

In the section 16 between the controlling chamber 27 and the valve closing chamber 20 is formed a pilot valve chamber 33, and in this chamber is mounted a double pilot valve 34, the upper end of which is adapted to rest on valve seat 35, the lower end being adapted to come to rest on valve seat 36. This pilot valve is formed with an angular stem 37 which extends upwardly through a port 38. The upper end of this angular stem is screwed into the lower end of a headed rod which passes upwardly through the plunger 30 and its stem. Lock nuts are screwed onto the upper end of the said rod and clamp it to the plunger. On the upper end of the adjustable sleeve 32 is secured a hand wheel. By rigidly securing the pilot valve to the controlling diaphragm it is manifest that the said valve will be positively reciprocated and will follow the movements of the said diaphragm. The pilot valve is also formed with a depending angular stem 39 which fits within a downwardly extending port 40. Port 38 opens into the controlling chamber and is closed when the pilot valve rests on valve seat 35. Port 40 communicates through passage 41 with the main reservoir supply pipe 4. Pilot valve chamber 33 is in communication with the valve closing chamber 20, through a passage and port formed in a cap 42 located within the valve closing chamber, said cap forming a stop to limit the upward movement of the valve closing diaphragm 18. The controlling chamber 27 is in communication with the train pipe chamber through passage 43 so that train pipe pressure will almost instantly be registered in the controlling chamber.

While air pressure from the main reservoir supply will unseat valve 24 I prefer to employ a light spring to insure the positive opening of said valve.

The feed valve described herein is fully shown and described in application filed December 15, 1916, Serial No. 137,252, and will not be specifically claimed herein.

The compensator C is controlled by equalizing reservoir pressure operating against train pipe pressure, and serves to admit main reservoir pressure to the train pipe or to exhaust train pipe pressure to atmosphere. This compensator is very sensitive in operation and has a large capacity, whereby the train pipe will be maintained at any desired pressure established in the equalizing reservoir during service and lap positions of the brake valve, by admitting air from the main reservoir directly to the train pipe.

Referring now in detail to the construction of the compensating valve shown, a diaphragm device is mounted in a suitable casing, and comprises the diaphragm 44 from which depends the valve-operating member or yoke 46. The upward movement of the diaphragm is limited by means of a screw 47. Diaphragm 44 divides the interior of the casing into an upper chamber 48 which communicates with the equalizing reservoir D through the pipe 6; and a lower chamber 49 which is at all times in communication with the train pipe 1 through the branch pipe 7. The release valve 50 has a winged portion which travels in a valve cage formed at the inner end of a passage 51, which leads to the atmosphere. At its lower end yoke 46 is provided with a horizontally extending arm 52, which is in alinement with the stem of the upwardly seating supply valve 53, so that at certain times said arm engages said stem to depress it and valve 53 to open same. Release valve 50 has an upward extension or neck 54 terminating in a head 55. The yoke 46 is provided with a forked portion which passes astride neck 54 as shown. Said forked portion has a limited play between the head 55 and valve 50. Valve 53 is provided with an upwardly extending stem and with a winged portion which plays within a stationary guide. Said valve 53 is normally held to its seat by a compression spring. The space below valve 53 communicates with the main reservoir E through pipe 8.

Operation of compensating valve: Before describing the operation it should be recalled that this compensating valve performs all the functions of the equalizing discharge valve and its piston (said piston being dispensed with), and in addition, certain other functions which will be hereinafter described. The engineer's valve proper will perform all of its well-known functions and maintain its various positions as before, namely full-release, running, service, lap and emergency positions. The charging of the train pipe is caused, as is well known in present braking systems of the standard type, by placing the engineer's valve in the full-release position in order quickly to charge the train pipe; said engineer's valve being placed at the running position, as in present practice, as soon as the desired maximum train pipe pressure has been obtained. The train pipe having thus been charged to the required pressure, and the equalizing reservoir D also being charged to an equality with the train pipe pressure, the result will be that the pressure in the equalizing chamber 48, which is in communication with the equalizing reservoir D, will be the same as the train pipe pressure in the train pipe chamber 49 of the compensating valve, said chamber 49 being in direct communication with the train pipe through the pipe 7. With the pressure as just described, in order to make a reduction of the train pipe pressure the brake valve A is placed in the service position, thereby releasing air from the equalizing reservoir D to the atmosphere to any desired amount, and thus through pipe 6 releasing the pressure in the equalizing chamber 48 of the compensating valve below the pressure in the train pipe chamber 49 of said valve. The result of this change of pressure will be to allow the excess pressure in chamber 49 to raise the diaphragm 44 and the parts connected therewith to the position shown in Fig. 2, thus opening the release valve 50 to release train pipe air through passage 51 to atmosphere. When the train pipe pressure in the train pipe chamber 49 has thus been reduced beneath the pressure in equalizing chamber 48, said diaphragm and the parts carried thereby will move back to the lap position, thus closing the release valve 50 and cutting off further escape of train pipe air. If, instead of reducing the pressure in the equalizing reservoir D, as has just been described, the engineer's valve were operated in such a manner as to raise the pressure in the equalizing reservoir, and therefore in the equalizing chamber 48, the result would be a reverse operation, the pressure in equalizing chamber 48 exceeding that in train pipe chamber 49 and causing the supply valve 53 to open, thus supplying air to train pipe by way of branch pipe 8, past valve 53 and to the train pipe chamber 49, out of which the air passes by way of branch pipe 7 to the main train pipe 1.

It is evident that any reduction of pressure in the train pipe chamber 49 will operate the compensating valve in the same manner as an increase of pressure in the equalizing chamber 48.

The compensator described herein is shown in Patent No. 1,089,579, dated March 10, 1914.

The triple valve and change-over valve constituting the main and essential parts of the car equipment or individual braking units may be described as follows:

Section F of the triple valve contains the parts for securing the service applications and the release of the brakes, and also for charging the apparatus. This section also contains the parts by which the quick release of the brakes is secured by an increase of train pipe pressure. Section G of the triple valve contains the parts controlling the emergency applications of the brakes. The change-over valve K contains those parts which seal the train pipe reservoir from the train pipe and connect it to the brake cylinder upon an emergency application of the brakes, and also the devices by which the service reservoir is sealed from the brake cylinder whenever brake cylinder pressure equals or exceeds the pressure in the service reservoir.

The parts in service section F of the triple valve are constructed almost precisely as shown in application filed August 1, 1917, Serial No. 183,886, and operate as described in said application, and it is thought unnecessary to particularly describe herein every part of section F, and its operation. Section G is described in application Serial No. 131,818, filed November 17, 1916, and operates as described in said application, and it is thought unnecessary to particularly describe herein every part of section G.

Train pipe 1 leads into main train pipe chamber 57, in section F. Above chamber 57 and separated therefrom by main abutment or diaphragm 58, is an emergency reservoir chamber 67 in constant communication with emergency reservoir through passage 67$^a$. Abutment 58 coöperates with a hollow valve stem 59 provided with a reduced upper end forming valve 60. Diaphragm 58 carries sliding head 61 having a working fit around stem 59, and provided with downwardly facing valve seat 62 coöperating with charging valve 60.

Stem 59 is open at its lower end, but the bore in said stem terminates a little below valve 60, as indicated by dotted lines in Fig. 3. Air is admitted through inlets 63 into said bore. A plurality of ports 64 lead through the wall of head 61 to admit air to a clearance 65. Above valve 60 stem 59 is provided with a more reduced portion 66, the clearance around which conducts the air to chamber 67 from around stem 59 when valve 60 is opened.

Secured to portion 66 of stem 59 above abutment 58, is downwardly tapered valve 68 adapted to fit a corresponding seat 69 in head 61 of abutment 58. Valve 68 is so placed on stem 66 that when valve 60 is seated valve 68 is a considerable distance above seat 69. A disk and coil spring bring valve 60 to seat 62.

Stem 66 is bored axially and provided with a governing screw 70 formed with feed or charging ports.

Beneath chamber 57 and separated therefrom by cross wall 71 is chamber 72. Equalizing abutment 73 extends across chamber 72 to separate it from equalizing chamber 74. Chamber 72 is vented to atmosphere through port 75. Stem 59 screws into hub 76 of flange 77 of abutment 73. Flange 77 is formed with a central depending hollow stem which screws into valve cage 78 carrying flange 79 of abutment 73. Valve cage 78 forms a small chamber 80, having an outlet controlled by valve 81 seating downwardly and having downwardly extending stem 82 carrying exhaust valve 83 which opens and closes vent 84. Stem 82 is loosely connected to valve 83, and fits seat 85. Valve cage 78 has passages 86 below valve 81. Chamber 74 is in direct communication with brake cylinder through port 87 and passage 88.

Valve 89 is held to its seat by a spring and prevents air passing back to train pipe chamber 57 during an emergency application of the brakes when brake cylinder pressure exceeds train pipe pressure. Valve 81 is held yieldingly to its seat by spring 90.

Secured to the top of the section F is a supplemental body part 91, said part forming the upper wall of the emergency reservoir chamber 67 and containing the supplemental train pipe chamber 92 connected to main train pipe chamber 57 through a passage 93. A quick-release diaphragm 94 forms the upper wall of supplemental train pipe chamber 92, and carries a stem 95 guided in an adjustable stop. Diaphragm 94 is secured by cap plate 97 which forms chamber 98. An adjustable stop sleeve carries an adjustable plug, and within the sleeve is a spring. By adjusting the sleeve diaphragm 93 will be stopped at the desired point; and the tension of the spring may be varied by adjusting the plug. In body portion 91 is formed a train pipe reservoir chamber 96. Chamber 96 is at times in communication with chamber 92 through adjustable sleeve 99 the lower end of which forms a valve seat 100.

In chamber 92 is a valve 101 which seats on 100, the stem thereof extending through sleeve 99. In chamber 96 is a spring 102, compressed between the sleeve 99 and a cap plate. Chamber 96 is connected to the train pipe reservoir through a passage 104, and pipe 105; and with chamber 98 through passage 106. In supplemental train pipe chamber 92 a quick-release lever 107 is pivoted, its shorter arm 108 fitting in a slot in the stem 95 of the quick-release diaphragm. In its normal position the lower edge of the arm 108 engages the bottom wall of said slot, as shown clearly in Fig. 3. The longer arm 109 of said lever extends into a slot formed in valve 101, the said slot being somewhat wider than the end of said lever, and in its normal position the said lever extends through said slot out of contact with the upper and lower walls thereof, as indicated in dotted lines.

In portion 91 is formed a quick-release chamber 110 closed by cap 111 and in communication with pipe 112 through a passage 113. The chamber 110 is at times in communication with chamber 92 through an adjustable sleeve 114, the lower end of which forms a seat for an emergency reservoir release valve 115 yieldingly held by spring 116. The pressure of spring 116 may be regulated by screw 117. Valve 115 is formed with a stem 118 which is normally practically in engagement with the arm 109 of the quick-release lever.

The emergency reservoir chamber 67 is formed with an outlet 119, which is closed normally by a downwardly seating check valve 120 held to its seat by a spring 121. Outlet 119 is connected to the pipe 112 in which is arranged a maintaining valve 122, said valve being closed when it is desired to release the brakes gradually, and being open when the triple valve is arranged for quick-release operations.

The operation of the service section of the valve for service braking and for graduated releases need not be herein described. The quick-release features of the triple valve operate as follows:

Upon an increase of train pipe pressure the train pipe air flows into chamber 92 through passage 93, lifting the diaphragm 94. This operation, through the lever 107, will depress and open emergency reservoir release valve 115 thereby permitting emergency reservoir air to flow past valve 120 through pipe 112, passage 113, past valve 115 into the supplemental train pipe chamber and thence to the train pipe through passage 93 and train pipe chamber 57. After the valve 115 is opened quick-release lever 107 will engage and move downwardly valve 101, thereby opening train pipe reservoir chamber to the supplemental train pipe chamber and permitting the train pipe reservoir to be charged through chamber 96, passage 104 and pipe 105. The pressure in chamber 96 will equalize with pressure in chamber 98 through passage 106, and when said pressures equalize with the pressure in chamber 92 the parts will return to their normal positions and valves 101 and 115 will close. The recharging of the emergency reservoir will take place through the triple valve, and the train pipe reservoir will be charged through the valve 101, chamber 96 and pipe 105.

For service applications of the brakes, train pipe reservoir air will pass into the supplemental train pipe chamber 92 past valve 101 and thence into the train pipe chamber 57. Spring 102 lightly holds the valve 101 to its seat and there is sufficient lost motion between the valve head and the end of the lever 107 to permit said valve to be opened by the service reservoir air without moving the said lever.

A differential of pressures will be maintained in chamber 98 and supplemental train pipe chamber 92, due to the tension of the springs tending to seat valve 115 and return the lever 107 to its normal position.

The construction and operation of the parts in section G of the triple are as follows:

Train pipe chamber 57 is in direct communication with emergency train pipe chamber 123 through branch pipe 1ª. Chamber 123 is in direct communication with supplemental train pipe chamber 124, the lower wall of which is formed by emergency abutment 125. The upper wall of chamber 123 is formed by movable quick-action abutment or diaphragm 126. Between chambers 123 and 124 is wall 124ª formed with opening 127 and aperture 129, through which stem 130 of exhaust valve 131 slides. Abutment 126 carries stem 132 adapted to engage one end of lever 133, the other end of said lever engaging stem 130. Abutment 126 is also formed with upwardly extending stem 134 fitting loosely and sliding in sleeve 135 secured in the wall of casing G. There is a slight clearance between stem 134 and sleeve 135, so that there is a leakage of air between said parts when diaphragm 126 is depressed. Axial charging passage 136 extends through stems 132 and 134, the upper end thereof being closed by screw 137 which is also provided with a feed port 138 which permits free communication between chamber 123 and quick-action chamber 140 above diaphragm 126. Port 138 opens into a chamber formed by cap 142 and constituting a part of quick-action chamber 140 and in direct open communication therewith through openings 143. Quick-action chamber 140 is in communication with quick-action reservoir 144 through pipe 145, said quick-action reservoir adding to the capacity of chamber 140 and preventing a too rapid equalizing of pressures in chambers 140 and 123. When quick-action abutment 126 is depressed by a superior pressure in chamber 140, port 138 then permits the air to pass from chamber 140 to 123 through said port.

A disk and spring normally hold diaphragm 126 in its upward position, and oppose the pressure in chamber 140. A spring maintains exhaust valve 131 seated until it is lifted through lever 133.

Connected to abutment 125 and depending into chamber 128 is yoke 146. Extending into chamber 128 is arm 147 forming a chamber 148 which is open to atmosphere through port 149. Chamber 148 is adapted to be closed by valve 150 connected to yoke 146. Valve 150 is connected to the lower arm of yoke 146. Also connected to said yoke are upwardly opening valves 151 and 152. Valve 151 controls communication between emergency brake cylinder chamber 128 and pipe 153 connecting said chamber with emergency reservoir chamber 67. Valve 152 controls communication between chamber 128, pipe 154 and equalizing chamber 74.

In the normal position of the parts, chamber 128 is open to atmosphere through port 149, valve 150 being open. When, however, there is a superior pressure in chamber 128, emergency abutment 125 is raised and valve 150 is closed, preventing escape of air through port 149, and in turn opening valves 151 and 152.

Train pipe reservoir J is connected to train pipe and to triple valve, through change-over or retaining valve K, for all service applications of the brakes; and is connected to emergency brake cylinder chamber 128 for emergency applications of the brakes, as fully described hereinafter.

The change-over valve K consists of a casing forming large train pipe chamber 155 connected to train pipe 1 through pipe 105. The upper wall of chamber 155 is formed by flexible diaphragm or movable abutment 156 clamped in position by the upper section of the casing, said part forming the controlling chamber 157 above the diaphragm. Train pipe reservoir J is connected to the lower end of the retaining valve by pipe 158 opening into chamber 159 formed by cap 160 screwed on the lower end of the main casing.

Extending upwardly through the casing and into chamber 155, is tubular post 161 having valve 162 at its upper end. Sliding on post 161 is sleeve 163 carried by diaphragm 156 and adapted to be seated upon and unseated from valve 162 by variations in pressure in chambers 155 and 157. Through diaphragm 156 is a passage 164 placing chamber 155 in free communication with chamber 157. Around the lower margin of aperture 164 is valve seat 165 adapted to receive and coöperate with valve 162. Sleeve 163 is enlarged at its upper end to form small chamber 166, in communication with train pipe chamber 155 through aperture 167, so that when seat 165 is raised above valve 162 chamber 155 is in free communication with train pipe reservoir and chamber 157. Within chamber 155 is coil spring 168, bearing on the bottom wall thereof, and on the under side of diaphragm 156 and tending to separate seat 165 and valve 162 and maintain chamber 155 in communication with the train pipe reservoir.

In the wall of chamber 157 is aperture 169, closed by upwardly seating valve 170 carried by diaphragm 156 and positively moved to and from its seat through the movements of said diaphragm. Aperture 169 opens into chamber 171 in cap 172 to which pipe 173 is connected, said pipe leading from chamber 171 to emergency brake cylinder chamber 128 of triple valve section G.

In chamber 171 and seating downwardly on a valve seat formed at the end of aperture 169, is valve 174 yieldingly held to its seat by a light spring. This valve prevents the passage of air from chamber 171 through aperture 169 to chamber 157, but is so lightly held to its seat that air from chamber 157 may readily unseat it when the pressure in said chamber 157 exceeds that in chamber 171, plus the spring pressure on valve 174. The change-over valve K is shown and described in application filed November 17, 1916, Serial No. 131,818.

To secure an emergency operation of the triple valve a sudden and pronounced reduction in train pipe pressure is made, thereby reducing the pressure in chamber 123. This permits the superior pressure in quick-action chamber 140 to quickly depress quick-action diaphragm 126 thereby bringing stem 132 into engagement with lever 133 and opening exhaust valve 131. Supplemental train pipe chamber 124 is thereby exhausted to atmosphere through the large port controlled by valve 131, and the pressure therein reduced to zero.

Upon a sudden and prolonged reduction in train pipe pressure sufficient to secure the emergency application of the brakes, the pressure in chamber 155 of valve K is sufficiently reduced to permit the air in chamber 157 to depress diaphragm 156 and bring seat 165 down to valve 162, thereby closing communication between train pipe reservoir and chamber 155. The reduction in pressure in chamber 155, in an emergency application of the brakes, takes place more rapidly than air can flow from chamber 157 into chamber 155, due to the restricted passage around valve 162, and to the further fact that the train pipe reservoir is in communication with chamber 157 through large passage 164, so that the superior pressure in chamber 157 will depress diaphragm 156. As said diaphragm is depressed valve 170 is drawn downwardly from its seat, placing chamber 157 in communication with pipe 173 and emergency brake cylinder chamber 128 of the triple valve, valve 174 being readily unseated by the predominating pressure in chamber 157. This permits air from the service reservoir to flow through chamber 157 to said emergency brake cylinder chamber 128 in sufficient volume and pressure to raise emergency abutment 125, thereby opening valves 151 and 152 and closing valve 150 so that emergency reservoir air may pass through chamber 128, pipe 154 to chamber 74 and thence to brake cylinder. Air also passes from chamber 128 to chamber 72 through pipe 22, as described. It is, therefore, manifest that the train pipe reservoir volume is added to emergency reservoir volume during all emergency applications; and that train pipe reservoir air, upon entering emergency brake cylinder chamber 128, serves as the means for positively operating the means controlling communication between emergency reservoir chamber and brake cylinder. It is also manifest that by means of the change-over valve the train pipe reservoir is disconnected from train pipe so that the air from said reservoir cannot flow into train pipe upon an emergency application of the brakes. During all service applications, however, the reduction of pressure in chamber 155 is comparatively slow, permitting an equalization of pressures in chambers 157 and 155 and preventing seating of valve 162 upon seat 165. Spring 168 maintains the diaphragm 156 in its upper position until there is a material preponderance of pressure in chamber 157. The excessive pressure in chamber 157 must be sufficient to overcome spring 168, and this preponderance of pressure only occurs when the pressure in chamber 155 is reduced suddenly sufficient to secure the emergency operation of the triple valve.

The purpose of valve 174 is to prevent emergency reservoir air passing through valve K to train pipe reservoir J, should pressure in reservoir J be below that in chamber 128 after an equalization of pressures in brake cylinder and emergency reservoir. Superior pressure in chamber 171 holds valve 174 to its seat and there is no communicaton betweein train pipe reservoir J and chamber 171. Should brake cylinder pressure leak down, after an emergency application, to a point below the pressure in train pipe reservoir J, valve 174 will then be unseated by the superior pressure in chamber 157, and the train pipe reservoir volume will be then added to brake cylinder volume.

By means of quick-action reservoir 144 sufficient volume of air is provided to prevent a rapid equalization between chambers 140 and 123 after an emergency application of the brakes. This insures quick-action abutment 126 holding valve 131 open long enough to exhaust brake pipe and permit the release of emergency reservoir air through the operation of valve 151, diaphragm 123 and valve 152.

The operation of the brakes in applying and releasing is accomplished through the manipulation of the engineer's brake valve in the ordinary manner, a slow reduction in train pipe pressure producing a service application of the brakes and a sudden reduction in train pipe pressure resulting in an emergency application of the brakes. The charging of the apparatus is accomplished through the engineer's brake valve in the usual manner, except that air is supplied through the feed valve to maintain the train pipe pressure at normal running pressure when the brake valve is in running position, and air is released or exhausted from the train pipe through the compensator. Any loss in train pipe pressure due to leakage either from the train pipe or the brake cylinders is supplied from the main reservoir through the compensator when the brake valve is in lap position, and is governed by the equalizing reservoir pressure. The pressure in the equalizing reservoir is varied in the usual manner by the manipulation of the engineer's brake valve.

In controlling long trains it is desirable that a suitable number of braking units at the rear end of the train be arranged for quick-release operation, the braking units at the head end of the train operating in graduated release. It is manifest from the foregoing description of the triple valves that a graduated release is secured by a rise in train pipe pressure, without regard to the rate of increase. It is also manifest that the operation of the triple valves arranged to secure a quick release will be brought about by a predetermined rise in train pipe pressure without regard to the rate of rise. The extent of the increase in train pipe pressure necessary to secure the operation of the triple valves set for quick-release operation may be governed by regulating the pressure on the quick-release diaphragm 94, and this increase in pressure is preferably between three and five pounds. Assuming that the quick-release diaphragm is moved for a quick-release operation by an increase of 3 pounds in train pipe pressure, it is obvious that the triple valves set for graduated-release operations will effect only a partial release of the brakes upon such increase in train pipe pressure. The triple valves set for quick-release operation and those set for graduated-release operation will be operated by the same predetermined rise in train pipe pressure, and it is, therefore, not necessary that full-release pressure be attained in the train pipe.

The triple valves which are arranged for quick-release operation, as hereinbefore pointed out, cause the discharge of the emergency reservoir air into the train pipe, thereby locally increasing the train pipe pressure. When the triple valves that are arranged for quick-release operation are at the rear end of the train it is manifest that a wave of increased train pipe pressure will move forward from such triple valves. If the engineer's brake valve be placed in lap position after a predetermined increase in train pipe pressure for a graduated release of the triple valves near the head end of the train and a quick release of the triple valves at the rear end of the train, the wave of increased train pipe pressure moving forward in the train pipe will bring about a further graduated release of the brakes on the cars at the head end of the train. If, however, the brake valve be maintained in release position the increasing air pressure moving from the brake valve toward the rear end of the train will be met by the increasing air pressure moving forwardly from the rear end of the train, thereby very materially assisting in moving the triple valves at the forward end of the train to full-release position to secure a full release of the brakes throughout the train. The train pipe reservoirs increase the train pipe volume at each braking unit and are so proportioned that the brake cylinders will be supplied with maximum service braking pressure without depleting the train pipe sufficiently to produce an emergency application of the brakes. Upon an emergency application of the brakes the train pipe volume is instantly reduced locally at each braking unit through the operation of the change-over valves, said valves being operated by trapped train pipe air to seal the train pipe reservoirs from the train pipe in order to prevent their depletion through the exhaust of train pipe air. This is of great importance as it saves considerable time in recharging the apparatus after an emergency application.

The compensator valve is controlled by equalizing reservoir pressure and train pipe pressure. A decrease in equalizing reservoir pressure results in train pipe pressure opening the train pipe to atmosphere, thereby reducing the train pipe pressure to an equalization with the reduced equalizing reservoir pressure. Should the train pipe pressure thus established be reduced by leaks either from the train pipe or the brake cylinders, equalizing reservoir pressure immediately opens communication between the main reservoir and the train pipe to raise the train pipe pressure to the established pressure in the equalizing reservoir. In the type of brakes described herein wherein the train pipe air is used for service applications of the brakes and wherein the brake cylinder pressure is relied upon to move the triple valve to lap position, it is necessary that means be provided for automatically maintaining the train pipe pressure corresponding to the established pressure in the equalizing reservoir. By this means the engineer, by noting the pressure in the equalizing reservoir, can ascertain quite accurately the pressure in all of the brake cylinders of the train. The brake cylinder pressure depends upon the train pipe pressure so that by maintaining a certain definite reduced train pipe pressure a certain definite brake cylinder pressure will be maintained in all the brake cylinders of the train without regard to brake cylinder and train pipe leaks, and without regard to the length of piston travel.

It is also to be noted that upon an emergency application of the brakes the train pipe is not only reduced in volume by sealing the train pipe reservoirs at each braking unit, but the train pipe is vented locally to atmosphere at each braking unit thereby almost instantly reducing the train pipe to zero throughout the entire length of the train.

What I claim is:

1. An air brake system consisting of a series of brake units in which the triple valves are operated by a slow reduction in train pipe pressure to admit train pipe air to the brake cylinders for service applications of the brakes by train pipe pressure alone, and wherein upon a sudden reduction of train pipe pressure emergency reservoir air is admitted to the brake cylinders for emergency applications of the brakes, some of said triples operating in graduated release and maintaining the emergency reservoirs sealed from the train pipe when the triple valves are operated by an increase of train pipe pressure to effect a partial release of the brakes, and some of the triple valves being arranged to operate in quick-release and operating to connect the emergency reservoirs with the train pipe to fully release the brakes, whereby the air in the emergency reservoirs connected with the triple valves operating in graduated release will be fully reserved for emergency braking operations, while the air in the emergency reservoirs connected with the triple valves operating in quick release will be equalized into the train pipe to fully release the brakes of those units operating in quick release and to assist in raising the train pipe pressure throughout the remaining portion of the train pipe to eventually effect a full release of the brakes controlled by the triple valves operating in graduated release.

2. An air brake system consisting of a series of brake units, each brake unit consisting of a triple valve, a brake cylinder and an emergency reservoir and all of said units being connected by a train pipe, some of said triples operating in graduated release and maintaining the emergency reservoirs sealed from the train pipe when the triple valves are operated by an increase of train pipe pressure to effect a partial release of the brakes, and some of the triple valves being arranged to operate in quick-release and operating to connect the emergency reservoirs with the train pipe to fully release the brakes, whereby the air in the emergency reservoirs connected with the emergency reservoirs connected with the triple valves operating in graduated release will be fully reserved for emergency braking operations, while the air in the emergency reservoirs connected with the triple valves operating in quick release will be equalized into the train pipe to fully release the brakes of those units operating in quick release and to assist in raising the train pipe pressure throughout the remaining portion of the train pipe to eventually effect a full release of the brakes controlled by the triple valves operating in graduated release.

3. An air brake system consisting of a series of brake units, each brake unit consisting of a triple valve, a brake cylinder and an emergency reservoir and all of said units being connected by a train pipe, some of said triples operating in graduated release and maintaining the emergency reservoirs sealed from the train pipe when the triple valves are operated by an increase of train pipe pressure to effect a partial release of the brakes, and some of the triple valves being arranged to operate in quick release and operating to connect the emergency reservoirs with the train pipe to fully release the brakes, whereby the air in the emergency reservoirs connected with the triple valves operating in graduated release will be fully reserved for emergency braking operations, while the air in the emergency reservoirs connected with the triple valves operating in quick release will be equalized into the train pipe to fully release the brakes of those units operating in quick release and to assist in raising the train pipe pressure throughout the remaining portion of the train pipe to eventually effect a full release of the brakes controlled by the triple valves operating in graduated release, the graduated-release triples and the quick-release triples being operated by a certain predetermined rise in train pipe pressure without regard to the rate of rise and less than the full-release pressure.

4. An air brake system consisting of a series of brake units in which the triple valves are operated by a slow reduction in train pipe pressure to admit train pipe air to the brake cylinders for service applications of the brakes by train pipe pressure alone, and wherein upon a sudden reduction of train pipe pressure emergency reservoir air is admitted to the brake cylinders for emergency applications of the brakes, some of said triples operating in graduated release and maintaining the emergency reservoirs sealed from the train pipe when the triple valves are operated by an increase of train pipe pressure to effect a partial release of the brakes, and some of the triple valves being arranged to operate in quick-release and operating to connect the emergency reservoirs with the train pipe to fully release the brakes, whereby the air in the emergency reservoirs connected with the triple valves operating in graduated release will be fully reserved for emergency braking operations, while the air in the emergency reservoirs connected with the triple valves operating in quick release will be equalized into the train pipe to fully release the brakes of those units operating in quick release and to assist in raising the train pipe pressure throughout the remaining portion of the train pipe to eventually effect a full release of the brakes controlled by the triple valves operating in graduated release, the graduated-release triples and the quick-release triples being operated by a certain predetermined rise in train pipe pressure without regard to the rate of rise and less than the full-release pressure.

5. An air brake system consisting of a series of brake units in which the triple valves are operated by a slow reduction in train pipe pressure to admit train pipe air to the brake cylinders for a service application of the brakes by train pipe pressure alone and wherein upon a sudden reduction of train pipe pressure emergency reservoir air is admitted to the brake cylinders for an emergency application of the brakes and wherein the train pipe volume is augmented by a train pipe reservoir in each brake unit, each brake unit being provided with means operating upon a sudden reduction in train pipe pressure and independently of brake cylinder pressure to seal the train pipe reservoir from the train pipe to locally reduce the volume of the train pipe at each brake unit.

6. An air brake system consisting of a series of brake units in which the triple valves are operated by a slow reduction in train pipe pressure to admit train pipe air to the brake cylinders for a service application of the brakes by train pipe pressure alone and wherein upon a sudden reduction of train pipe pressure emergency reservoir air is admitted to the brake cylinders for an emergency application of the brakes and wherein the train pipe volume is augmented by a train pipe reservoir in each brake unit, each brake unit being provided with means operating upon a sudden reduction in train pipe pressure and independently of brake cylinder pressure to seal the train pipe reservoir from the train pipe to locally reduce the volume of the train pipe at each brake unit, whereby the train pipe will be of the desired volume for service braking purposes and will be materially reduced in volume during emergency braking operations.

7. An air brake system consisting of a series of brake units in which the triple valves are operated by a slow reduction in train pipe pressure to admit train pipe air to the brake cylinders for a service application of the brakes by train pipe pressure alone and wherein upon a sudden reduction of train pipe pressure emergency reservoir air is admitted to the brake cylinders for an emergency application of the brakes and wherein the train pipe volume is augmented by a train pipe reservoir in each brake unit, each brake unit being provided with means operating upon a sudden reduction in train pipe pressure and by train pipe air and independently of brake cylinder pressure to seal the train pipe reservoir from the train pipe to locally reduce the volume of the train pipe at each brake unit.

8. An air brake system in which triple valves are operated by a slow reduction in train pipe pressure to admit train pipe air to the brake cylinders for service applications of the brakes by train pipe pressure alone and wherein upon a sudden reduction of train pipe pressure emergency reservoir air is admitted to the brake cylinders for an emergency application of the brakes, and wherein the train pipe volume is augmented by train pipe reservoirs at each triple valve, each braking unit being provided with means operating upon a sudden reduction in train pipe pressure and independently of brake cylinder pressure to seal the train pipe reservoir from the train pipe and thereby locally reduce the volume of the train pipe, and also being provided with means at each braking unit to vent the train pipe to atmosphere, whereby the train pipe will be locally reduced in volume at each braking unit and the reduced train pipe vented to atmosphere.

9. An air brake system in which triple valves are operated by a slow reduction in train pipe pressure to admit train pipe air to the brake cylinders for service applications of the brakes by train pipe pressure alone and wherein upon a sudden reduction of train pipe pressure emergency reservoir air is admitted to the brake cylinders for an emergency application of the brakes, and consisting of a plurality of braking units each of said units consisting of a triple valve, a brake cylinder, and an emergency reservoir, some of said triple valves being arranged to operate in graduated release and some of said triples being arranged to operate in quick release, the graduated-release triples and the quick-release triples being operated by a certain predetermined rise in train pipe pressure without regard to the rate of rise and less than the full-release pressure.

10. An air brake system in which triple valves are operated by a slow reduction in train pipe pressure to admit train pipe air to the brake cylinders for service applications of the brakes by train pipe pressure alone and wherein upon a sudden reduction of train pipe pressure emergency reservoir air is admitted to the brake cylinders for an emergency application of the brakes, and consisting of a plurality of braking units each of said units consisting of a triple valve, a brake cylinder, and an emergency reservoir, some of said triple valves being arranged to operate in graduated release and some of said triples being arranged to operate in quick release, the triples arranged for quick-release operation being actuated by a predetermined rise in train pipe pressure without regard to the rate of rise and less than full-release pressure, and the triples arranged for graduated - release operation obtaining a partial release of the brakes by the same predetermined rise in train pipe pressure and without regard to the rate of rise.

11. An air brake system comprising a train pipe, a series of triple valves, a brake cylinder for each triple valve, an emergency reservoir for each triple valve, one or more triple valves operating in graduated release to release a part of the brake cylinder pressure at a given increase in train pipe pressure and to then be returned to lap position by the remaining brake cyinder pressure, the other triple valves of the series operatting in quick release through the same increase in train pipe pressure to release the emergency reservoir air into the train pipe to quickly raise the train pipe pressure locally to full-release pressure to secure the full release of the brakes controlled by said quick - release triple valves, the increased train pipe pressure thus locally established in the train pipe equalizing with the pressure initially established therein and thereby assisting in raising the train pipe air to full-release pressure throughout the length of the train.

12. An air brake system comprising a train pipe, a series of triple valves, a brake cylinder for each triple valve, an emergency reservoir for each triple valve. one or more triple valves operating in graduated release to release a part of the brake cylinder pressure at a given increase in train pipe pressure without regard to the rate of rise and to then be returned to lap position by the remaining brake cylinder pressure, the other triple valves of the series operating in quick release through the same increase in train pipe pressure to release the emergency reservoir air into the train pipe to quickly raise the train pipe pressure locally to full-release pressure to secure the full release of the brakes controlled by said quick - release triple valves, the increased train pipe pressure thus locally established in the train pipe equalizing with the pressure initially established therein and thereby assisting in raising the train pipe air to full-release pressure throughout the length of the train.

13. An air brake system comprising a train pipe, a series of triple valves, a brake cylinder for each triple valve, an emergency reservoir for each triple valve, one or more triple valves at the head end of the train operating in graduated release to release a part of the brake cylinder pressure at a given increase in train pipe pressure, and to then be returned to lap position by the remaining brake cylinder pressure, one or more triple valves at the rear end of the train operating in quick release through the same increase in train pipe pressure to release the emergency reservoir air into the train pipe to quickly raise the train pipe pressure locally to full-release pressure to secure the full release of the brakes controlled by said quick-release triple valves, the increased train pipe pressure thus locally established near the rear end of the train equalizing with the pressure initially established therein at the head end of the train and thereby assisting in raising the train pipe air to full-release pressure throughout the length of the train.

14. An air brake system consisting of a series of brake units in which the triple valves are operated by a slow reduction in train pipe pressure to admit train pipe air to the brake cylinders for a service application of the brakes by train pipe pressure alone, the brake cylinder pressure assisting train pipe pressure in overcoming emergency reservoir pressure to move the triple valve back to lap position, and wherein upon a sudden reduction in train pipe pressure emergency reservoir air is admitted to the brake cylinders for an emergency application of the brakes and wherein the triple valve is moved by emergency reservoir pressure upon a leak-down of brake cylinder pressure to permit train pipe air to flow into the brake cylinder to compensate for brake cylinder leaks, a compensator, an engineer's brake valve, a main reservoir and an equalizing reservoir on the engine, the compensator being controlled by equalizing reservoir pressure opposed to train pipe pressure and controlling a connection between the main reservoir and the train pipe and between the train pipe and atmosphere whereby train pipe air to compensate for brake cylinder leaks will be supplied from the main reservoir through the operation of the compensator after the desired train pipe pressure has been established in the equalizing reservoir.

15. An air brake system consisting of a series of brake units in which the triple valves are operated by a slow reduction in train pipe pressure to admit train pipe air to the brake cylinders for a service application of the brakes by train pipe pressure alone, the brake cylinder pressure assisting train pipe pressure in overcoming emergency reservoir pressure to move the triple valve back to lap position, and wherein upon a sudden reduction in train pipe pressure emergency reservoir air is admitted to the brake cylinders for an emergency application of the brakes and wherein the triple valve is moved by emergency reservoir pressure upon a leak-down of brake cylinder pressure to permit train pipe air to flow into the brake cylinder to compensate for brake cylinder leaks to secure and maintain a uniform braking pressure without regard to the piston travel or brake cylinder leaks, some of said triples operating in graduated release and maintaining the emergency reservoirs sealed from the train pipe when the triple valves are operated by an increase of train pipe pressure to effect a partial release of the brakes, and some of the triple valves being arranged to operate in quick release and operating to connect the emergency reservoirs with the train pipe to fully release the brakes, whereby the air in the emergency reservoirs connected with the triple valves operating in graduated release will be fully reserved for emergency braking operations, while the air in the emergency reservoirs connected with the triple valves operating in quick release will be equalized into the train pipe to fully release the brakes of those units operating in quick release and to assist in raising the train pipe pressure throughout the remaining portion of the train pipe to eventually effect a full release of the brakes controlled by the triple valves operating in graduated release.

In testimony whereof I hereunto affix my signature.

SPENCER G. NEAL.

Copies of this patent may be obtained for five cents each, by addressing the "Commissioner of Patents. Washington, D. C."